(12) United States Patent
Kristoffersen et al.

(10) Patent No.: US 10,198,012 B2
(45) Date of Patent: Feb. 5, 2019

(54) SYSTEM AND METHOD FOR ROUTING CHEMICALS IN A CHEMICAL PLANT

(71) Applicant: NATIONAL OILWELL VARCO NORWAY AS, Kristiansand S (NO)

(72) Inventors: Svenn Kristoffersen, Kristiansand S (NO); Jan Helge Sørensen, Vettre (NO); Tormod Hertzenberg, Saetre (NO); Thomas Klemetsen, Tranby (NO); Deepak Arora, Oslo (NO)

(73) Assignee: National Oilwell Varco Norway AS (NO)

( * ) Notice: Subject to any disclaimer, the term of this patent is extended or adjusted under 35 U.S.C. 154(b) by 111 days.

(21) Appl. No.: 15/022,369

(22) PCT Filed: Sep. 23, 2014

(86) PCT No.: PCT/NO2014/050174
§ 371 (c)(1),
(2) Date: Mar. 16, 2016

(87) PCT Pub. No.: WO2015/047101
PCT Pub. Date: Apr. 2, 2015

(65) Prior Publication Data
US 2016/0231754 A1 Aug. 11, 2016

Related U.S. Application Data

(60) Provisional application No. 61/991,076, filed on May 9, 2014, provisional application No. 61/881,648, filed on Sep. 24, 2013.

(51) Int. Cl.
*G05D 7/06* (2006.01)
*E21B 21/06* (2006.01)
(Continued)

(52) U.S. Cl.
CPC .......... *G05D 7/0635* (2013.01); *E21B 21/062* (2013.01); *G05B 13/041* (2013.01); *E21B 2041/0028* (2013.01)

(58) Field of Classification Search
CPC .... G05D 7/0635; G05B 13/041; E21B 21/062
See application file for complete search history.

(56) References Cited

U.S. PATENT DOCUMENTS

2006/0073764 A1* 4/2006 Simakov ................. B24B 47/22
451/5
2007/0233362 A1* 10/2007 Carriker ............... G06Q 10/047
701/532

(Continued)

FOREIGN PATENT DOCUMENTS

| EP | 23434 A2 * | 2/1981 | ............. B61L 27/04 |
|---|---|---|---|
| JP | H05108152 A | 4/1993 | |
| JP | 2007264821 A | 10/2007 | |

OTHER PUBLICATIONS

Aske, Elvira Marie B., et al., Coordinator MPC for maximizing plant throughput, Modeling, Identification and Control, vol. 29, No. 3, 2008, pp. 103-115 (14 pages).

(Continued)

*Primary Examiner* — Vincent H Tran
(74) *Attorney, Agent, or Firm* — Conley Rose, P.C.

(57) ABSTRACT

A system for automatic routing of chemicals includes a plurality of equipment, including a source and a destination, and one or more possible paths between the source and destination. The system further includes a process control unit to communicate with the equipment, a routing control unit to communicate with the process control unit. The routing control unit is provided with control algorithms for finding an optimum path between the source and the destination based at least partially on feedback from the process control unit.

26 Claims, 4 Drawing Sheets

(51) Int. Cl.
 *G05B 13/04* (2006.01)
 *E21B 41/00* (2006.01)

(56) References Cited

U.S. PATENT DOCUMENTS

| | | | |
|---|---|---|---|
| 2008/0165613 A1 | 7/2008 | Dykstra | |
| 2011/0046775 A1* | 2/2011 | Bailey | B07C 3/00 700/224 |
| 2015/0153725 A1* | 6/2015 | Matheny | G05B 19/4155 700/117 |

OTHER PUBLICATIONS

Uthgenannt, James A., Path and Equipment Allocation for Multiple, Concurrent Processes on Networked Process Plant Unit, Computer Chem. Engng vol. 20, No. 9, 1996, pp. 1081-1087 (8 pages).
Rojas-D'Onofrio, Jorge I., et al., Path Search Algorithm for Connections with Pumps in Crude Oil Pipe Networks, 18th IFAC World Congress Milano (Italy) Aug. 28-Sep. 2, 2011 pp. 2167-2171 (5 pages).
Written Opinion for PCT/NO2014/050174 dated Mar. 5, 2015 (9 pages).
English translation of abstract for JP 2007264821 (2 pages).
English translation of abstract for JPH05108152 (2 pages).

\* cited by examiner

SYSTEM AND METHOD FOR ROUTING CHEMICALS IN A CHEMICAL PLANT

CROSS-REFERENCE TO RELATED APPLICATIONS

The present application is a 35 U.S.C. § 371 national phase application of PCT/NO2014/050174 with international filing date of Sep. 23, 2014 and claims priority thereto, and further claims priority to provisional applications U.S. 61/881,648 and U.S. 61/991,076. Each of the three above-identified applications is incorporated herein by reference in its entirety for all purposes

STATEMENT REGARDING FEDERALLY SPONSORED RESEARCH OR DEVELOPMENT

Not applicable.

BACKGROUND

The present disclosure relates to a system and a method for routing of chemicals, such as chemicals related to drilling fluids. In the following discussion, drilling fluids and a drilling fluid plant will be used to exemplify the disclosure, though the invention, claimed below, is not limited to this specific use.

Drilling Fluids are made up of many different chemicals (additives); some in powder form and others in liquid form. The composition of the chemicals varies greatly. Drilling fluid plants contain a complex matrix of tanks, pipes, valves, pumps, mixers etc. These are used for storing and transferring different chemicals from one place, a source, to another, a destination, when required and to mix the different chemicals together to achieve a homogenous drilling fluid with the necessary properties needed at any given time.

In certain conventional drilling fluid plants, chemicals are routed in a manual or semi-automatic way, meaning the operator needs to plan what route the chemicals should take from the source, such as a storage tank, to a destination, such as a mixing tank, without interfering with other ongoing processes. Thereafter, all the equipment on the route needs to be operated individually in a given order. In some cases, there may be static/fixed routes available where a process control unit has logics to operate specific equipment along the route.

Because the number of valves, pumps, mixers etc. that need to be engaged typically is large and spread out over a large area, and thus is part of a complex matrix of piping, routing of chemicals from a source to a destination may be a complex and time-consuming process, requiring high skills from an operator. Finding an optimum path between source and destination is particularly complicated, especially when multiple simultaneous routings/parallel flows are required. Erroneous or sub-optimal routing of chemicals is therefore quite common, which may result in unwanted situations such as contamination of fluids, the need to discard chemicals, high cost, negative HSE issues, poor drilling efficiency, poor product quality, drilling-downtime, and inferior personnel safety.

Before starting a transfer of chemicals, the operator must first plan which route the chemicals should take. The operator needs to subjectively make several critical considerations so as to decide if there are any available transfer routes, whether a fast transfer and/or a maximum throughput is required, whether any equipment should be avoided, whether any equipment must be used (for instance a specific pump, mixer etc.) and whether a transfer along the planned route in any way will interfere with an ongoing transfer. Based on these and other considerations, the operator needs to choose an optimum route/path for the chemical transfer. After choosing the optimum route, the operator also needs to consider if any equipment needs be executed in a specific order. When the transfer is ongoing, the operator further needs to constantly and carefully monitor the progress of the chemical transfer so as to detect any deviation, such as equipment failure, from a normal operation. In case of a deviation, the operator then needs to stop the ongoing operation by shutting down equipment, potentially in a required order, and then re-plan. With the potential complexity of a chemical plant, the amount of manual involvement in a chemical transfer process makes it highly probable that the transfer process will be sub-optimal or even incorrect, thus leading to potential inefficient transfer, excessive wear of equipment, high equipment down-time, high chemical contamination and excessive waste.

By dividing the plant into a number of fixed, non-dynamic, chemical transfer routes, the flexibility of the transfer system is significantly reduced as is the number of available routes. One route may be optimal, or near optimal, under normal operating conditions, but in the case of a deviation there may be only a few, if any, alternatives for the operator.

SUMMARY OF THE DISCLOSURE

Presented is a method directed to providing a remedy or at least reducing at least one of the drawbacks of the prior art, or at least provide a useful alternative to prior art.

This is disclosed in the description below and in the claims that follow.

The following definitions of some expressions are used in the present description to simplify understanding of the disclosure.

"Equipment" will refer to any means needed to store, transfer and mix chemicals, as well as instrumentation used for monitoring process values. "Equipment" may be valves, motors, pumps, mixers, tanks, level transmitters etc. "Equipment" may also be composite means, such as machinery, consisting of more than on piece of equipment.

"Graph" shall be understood as a representation of a set of objects where some pairs of objects are connected by links. The interconnected objects are represented by mathematical abstractions called vertices/nodes, and the links that connect some pairs of vertices are called edges. Herein, the graphs are typically depicted in diagrammatic form as a set of squares, rectangles and ellipses for the vertices, joined by lines or curves for the edges.

On a graph-model of a drilling fluid plant, the vertices represent a piece of equipment. Further, the edges represent the connectivity between vertices. The edges may be directed, implying that the edges have specific direction associated with them, or undirected, implying that where the edges do not have a specific direction associated with them. On a graph model of a drilling fluid plant, the edges will typically represent piping. Directed edges are normally shown by arrows on the graph indicating the direction of flow of chemicals. Each edge has a cost/weight associated with it. The cost may be a fixed value or a calculated value as based on pipe length, diameter, inclination, bend, etc. Different transfer operations with different requirements and chemicals involved may also set different weights on one edge. The weight may change dynamically.

In graph theory, a shortest path problem is the task of finding a path between two vertices which minimizes the sum of weights of its constituent edges. A widest path problem, often referred to as a bottleneck, is the task of finding a path between two designated vertices in a weighted graph that maximizes the weight of the minimum-weight edge in the path.

According to the present disclosure, an optimum path problem is solved for finding a path between a source and a destination in a chemical plant. The task of finding an optimum path is not necessarily the task of finding a shortest or widest path problem, even if it might be. The optimum path will depend on the specific operation in question, and may be a shortest path, e.g. minimum pipe length, minimum number of valves involved, maximum throughput, e.g. widest diameter and/or most powerful pumps etc., maximum resource utilization, least interference with other ongoing processes.

One purpose of the present disclosure is to provide a fault tolerant automation of the process of transferring chemicals from a source to a destination by finding the optimum path therebetween while managing the equipment involved.

A first exemplary aspect of this disclosure is related to a system for automatic routing of chemicals related to drilling fluids, the system comprising:
  a plurality of equipment, including a source and a destination;
  one or more possible paths between said source and said destination;
  a process control unit being adapted to communicate with one or more of said plurality of equipment; and
  a routing control unit, the routing control unit being adapted to communicate with the process control unit, wherein said routing control unit is provided with control algorithms for finding an optimum path between said source and said destination based at least partially on feedback from said process control unit.

The process control unit may be one or more PLCs and/or microcontrollers and/or computers or the like, adapted to control and/or communicate with one or more of said plurality of equipment. The process control unit may be connected to equipment via inputs and outputs and may contain logic to operate the equipment depending on feedback from the system and/or from an operator.

It should be noted that the source and destination in one specific embodiment may be the same piece of equipment, for instance a storage tank, since in some situations it may be necessary to circulate and mix up drilling fluids due to sedimentation. The drilling fluid may therefore be transferred back to the source tank after mixing, whereby the storage tank may be both the source and the destination.

In one embodiment the system may comprise a plurality of sources and/or destinations. A typical drilling fluid plant may comprise a large number of pressure tanks, storage tanks, pumps, mixers, pipes etc. The more complex the system, the more important it will be to be able to automatize at least parts of the transfer process. In one embodiment, the routing control unit may thus be provided with a graph model depicting one or more of said plurality of equipment and one or more paths therebetween. Typically the graph model may include a large number of equipment, including a plurality of sources, destinations and paths therebetween. The representation of sources, destinations, paths and appurtenant equipment in a graph model may enable the use of graph search algorithms to find optimum paths.

In one embodiment, said routing control unit may comprise a routing module, a business logic module and a user interface module.

The routing module may be a platform-independent application, i.e. it may run on Windows, MAC, Linux etc., written in programming language such as C++, Java or C#. The routing module may further comprise different building blocks such as a communication interface enabling communication with external components, such as other parts of the routing control unit, including the business logic module and the user interface module, and the process control unit. The routing module may also comprise a path-finding module for harnessing various algorithms to calculate an optimized transferring path using information from the business logic module and the process control unit. The routing module may further comprise a request processor for receiving, processing and tracking requests, typically manually input form the user interface module or from the process control unit. The request processor may further operate equipment, via the process control unit, and monitor status of the equipment.

The process control unit may be adapted for bi-directional communication with the routing control unit. This implies that the process control unit may not only supply feedback to the routing control unit, but also receive commands from the routing control unit. In such an embodiment, the user interface module may be bypassed and the routing control unit may receive commands directly from the process control unit.

The business logic module may contain a set of configurations, rules and a representation of the plant. The business logic module may further encode the connectivity between the different equipment, such as valves, operating order, and other configurations. The business logic module may be a database, such as MySQL/SQLite or a flat-file, such as in XML/JSON format. The graph model discussed above may be a part of the business logic module. In the graph model, properties may be put on edges and vertices, and costs/weights may be assigned to each edge. The graph model may also implement constraints restricting the allowable paths.

An operator may communicate with the system through a user interface module, through which commands may be entered and feedback received. A system according to this disclosure may be provided with a plurality of interface modules.

In one embodiment, the system may comprise a communication layer through which said routing control unit may communicate with said process control unit. The communication layer may enable communication between the routing control unit and the process control unit and the various parts and modules thereof. In one embodiment, the communication layer may comprise one or more of the following:
  IPC methods, such as DDE/OPC/socket/Message passing/MPI/Shared memory/ TCP/UDP, etc; and
  cloud computing, such as a distributed system with load-balancing which is redundant, fault tolerant and with distributed transparency.

The communication layer may to allow for retro-fitting, i.e. it may allow installation of a routing control unit on top of an already installed process control unit in a system. As an example, a process control unit may already be installed on a rig or in a plant and it may be desirable to install a routing system "on top of this" later on. The configuration with the communication layer may enable such an upgrade without having to make significant changes to the existing process control system. Modularizing the system also makes it easier to develop the various components independently and, if need be, swap out with alternative solutions at a later stage. The communication layer may also allow the various components to be run across different machines.

In one embodiment, one or more constraints may be built into said routing control unit, inhibiting the use of one or more possible paths or parts of possible paths. The constraints will typically, but not necessarily, be built into the business logic module to extend the logic. Constraints may be process specific. For instance, during certain processes it may be desirable to limit or avoid the use of high-angular pipe bends so as to avoid excessive abrasion and wear of pipes. This may be of particular importance when transferring a chemical comprising non-fluid material, such as drilling mud powder.

In one embodiment, the routing control unit may include a storage unit for storing/caching information about previously calculated optimum paths between said source and said destination. This may simplify re-use of previously and frequently performed transfer operations.

A system as described above may contain algorithms, logics and interfaces. The system may be designed to use adaptive routing driven by business logic rules, which may be plant specific, and include information on pipe arrangement, equipment count, distances. Such system may calculate, control and perform multiple, simultaneous chemical transfer operations.

A second exemplary aspect of this disclosure relates more particularly to a method for automatic routing of chemicals by means of a system according to the first aspect described above, wherein the method includes the steps of:
  finding an optimum path between said source and said destination based at least partially on feedback from said process control unit; and
  transferring said chemicals from said source to said destination along said optimum path by regulating one or more of said plurality of equipment.

The transferring may be executed by the routing control unit sending instructions to the process control unit, the process control unit further regulating the necessary equipment, such as pumps, valves, mixers etc., so as to execute the transfer, and preferably also monitor the transfer.

The step of finding the optimum path between said source and said destination may include the step of depicting one or more sources, one or more destinations and one or more paths in a graph model in the routing control unit. Representing a chemical plant in a graph model enables the use of graph search algorithms to optimize the chemical transfer processes. In one embodiment, the search algorithm may be implemented in the routing module of the routing control unit.

The step of implementing a graph search algorithm may include using a shortest path algorithm, such as Dijkestra's shortest path algorithm. The person of ordinary skill in the art will understand that other shortest path algorithms, such as Gabow's algorithm or the Bellman-Ford algorithm, also may be useful in certain embodiments.

In addition, or as an alternative, the step of implementing a graph search algorithm may include the step of using a resource-constrained shortest path algorithm. The resource-constrained shortest path algorithm may be implemented by running a shortest path search after discarding edges that violate a certain set of constraints. As examples, constraints may include avoiding transfer pipes with a diameter lower than a certain limit so as to optimize throughput or it may include avoiding high-angular pipe bends for reasons discussed above.

In addition, or as an alternative, the step of implementing a graph search algorithm may include implementing a path search algorithm minimizing interferences (PSAMI) using a Ford-Fulkerson algorithm, implying that the algorithm may maximize flow while minimizing interference between simultaneously ongoing transfer processes.

The step of finding an optimum path between said source and said destination may further include the step of manually supplying information to routing control unit. This may typically be information about the specific operation to be executed, but also information about restrictions or specific know-how about mixing of chemicals or the chemical plant etc.

In one embodiment, the step of transferring the chemicals may include operating equipment along said optimum path in a pre-determined order. For some of the equipment to function optimally, it may be necessary to start and/or stop the equipment in a predetermined order. It may for instance be necessary to open a specific valve prior to starting an appurtenant pump so as to not run the pump dry.

The method may include the step of simultaneously transferring chemicals along multiple paths between multiple sources and multiple destinations in the system. The routing control unit may be configured to calculate and operate multiple chemical transfer processes at the same time, which may significantly increase the efficiency of a system according to the present disclosure.

The method may include the step of adapting an ongoing transfer of chemicals between said source and said destination by means of the routing control unit, based on feedback from the process control unit. The feedback from the process control unit may be feedback from one or more PLCs or the like about the status of one or more of said plurality of equipment. It may be information about failure or the need for maintenance in a piece of equipment, from which information about a new constraint is added to the routing control unit, for instance to the business logic module, whereby an alternative path may need to be calculated on the fly.

The method may further include the step of storing/caching data related ongoing and completed processes. This may enable the use of data mining to optimize use of a system according to the disclosure herein, for instance, to log the use of individual equipment to predict maintenance circles. A person of ordinary skill in the art will know that caching may be active, implying that the data is maintained in a shared location, such as a PLC memory or another computer, or the caching may be inactive, implying that data is maintained in a hard-drive, where back-up is taken at regular intervals. The inactive, hard drive-stored data may be used to build active data.

For improved safety and/or reliability, it may be desirable to install more than one routing control unit and/or more than one routing module. The system may be designed so that the different routing control units and/or routing modules share information through the communications layer. If a routing means fails, another routing means may take over.

In one embodiment, the routing control unit may be adapted to perform load balancing so as to distribute a workload evenly across two or more computers, network links, CPUs, hard-drives or other resources, in order to optimize resource utilization, maximize throughput, minimize response time and avoid overload. Described below are some of the scenarios which exemplify and illustrate how load balancing may be utilized in the routing control unit:
  Multiple threads/processes may be created, each capable of managing the complete routing cycle/process. Multiple requests arriving at the same time may be processed by any routing control unit with available resources. The different control units may be given unique tasks, e.g. a CPU1 may find the optimum route, a CPU2 may start/stop equipment in an assigned order, a CPU3 may ensure that feedback is correct and a CPU4 may be a master controller that orchestrates CPU1-3. Further, the routing control unit may delegate composite object sequencing /handling to the process control unit or to an external controller. As an example, the routing control unit may handle individual valves while it delegates individual start/stop of equipment within composite objects, like a machine, to the process control unit. The routing control unit may request the machine to start or stop and may monitor the equipment/machine status and respond accordingly, as may be defined by the business logic module. As a further example, the routing control unit may want to wait before auto-routing the remaining equipment until it has received an appropriate feedback (e.g. a "running" feedback) from the process control unit.

In one embodiment, the method may comprise the step of letting the system, according to the first aspect of the disclosure, take over an already ongoing transfer process. This may make it possible to start the system manually and then let the routing control unit take over the transfer process after it has been initiated.

There is also described a computer program product comprising instructions for causing a processor to perform the method according to second aspect of the disclosure.

There is also described a computer-readable medium containing instructions for executing the steps of the method according to the second aspect of the disclosure.

In the following is described an example of a preferred embodiment illustrated in the accompanying drawings, wherein:

DETAILED DESCRIPTION OF EXEMPLARY EMBODIMENTS

In the following, all figures are shown schematically. The shown features are not necessarily to scale.

Figure 1:
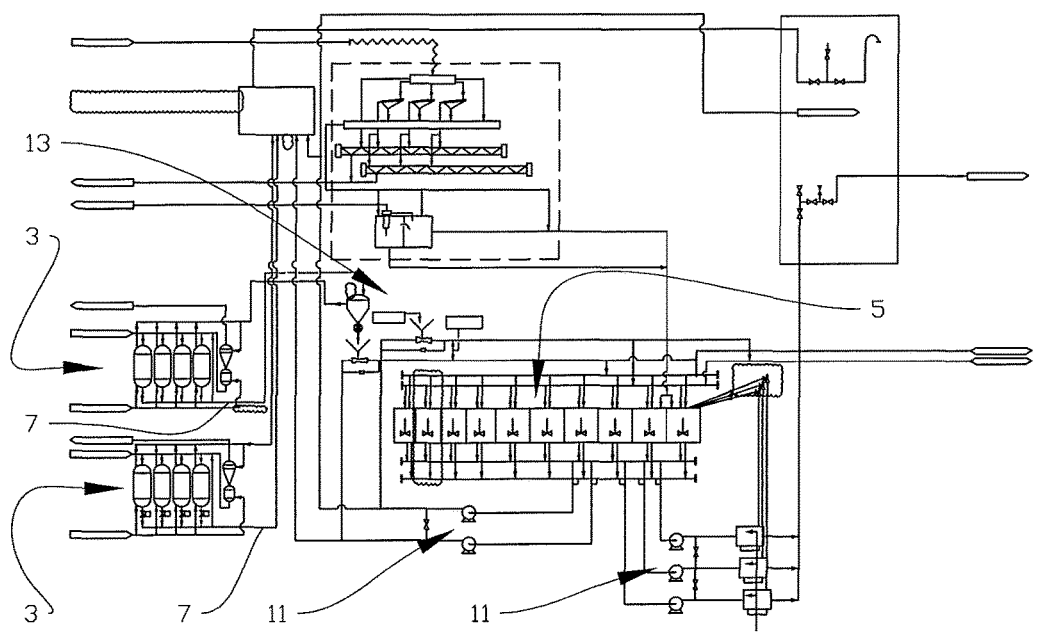
FIG. 1 shows a schematic overview of a typical plant for mixing drilling fluids.

FIG. 1 shows an overview of a drilling fluid plant 1. The figure is shown as an example of the complexity of a real-life plant for the mixing and treatment of drilling fluids. It is, however, beyond the scope of the present description to describe this plant in detail. Only a few parts of the drilling fluid plant 1 will be described herein. Reference number 3 denotes a plurality of sources in the form of storage pressure tanks for bulk powder barite and cement. A plurality of pipes 7 run from the storage pressure tanks 3 to a plurality of destinations 5 exemplified in the form of mud storage tanks. The bulk powder storage tanks 3 and the mud storage tanks 5 are connected to a mud mixing system 13 via the plurality of pipes 7 and a plurality of valves and pumps 11. The valves are not shown in FIG. 1 for simplicity, but a drilling fluid plant 1 like the one shown in the figure will typically be provided with in the order of 150 valves which may be used to direct the flow of chemicals through the plurality of pipes 7 along a designated path. The mud mixing system 13 will receive different chemicals, at least some of which comes from the storage pressure tanks 3, mix them together and transfer the mixture to the mud storage tanks 5.

Figure 2:
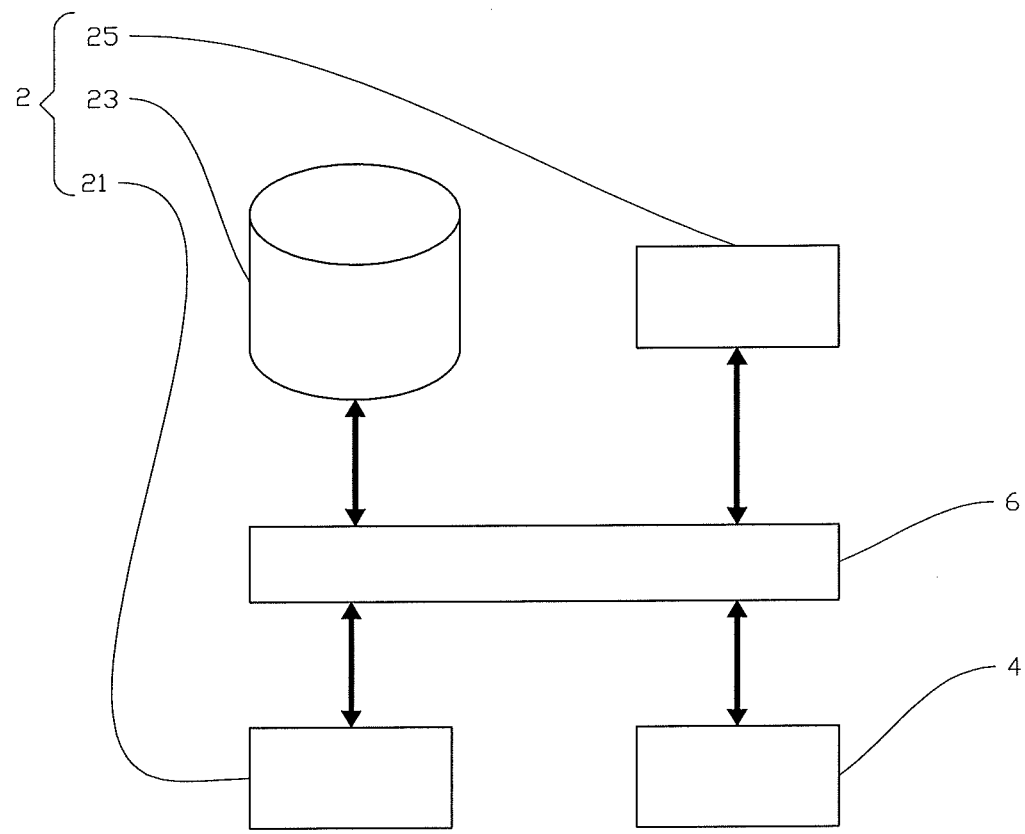
FIG. 2 shows the structure of a routing control unit and a process control unit as used in a system according to the present disclosure.

In FIG. 2, the internal structure of a routing control unit 2 and its connection to a process control unit 4 is shown. The routing control unit 2 is shown comprising a routing module 21, a business logic module 23 and a user interface module 25. The constituents of the routing control unit 2 were discussed above and will not be repeated here. Both the constituents of the routing control unit 2 and the process control unit 4 communicate via a communication layer 6. The communication layer 6 may be regarded as the backbone of the control units 2, 4 which allows the various components to access and share information. The business logic module 23 contains a set of configurations, rules and a graph representation of the plant. The process control unit 4 controls and monitors the various pieces of equipment in the plant. The user interface module 25 allows an operator to give commands and receive feedback. The routing module 21 automatically finds the optimum path based on information in the business logic module 23, commands given by an operator and by constantly monitoring the status of equipment through the process control unit 4.

Referring again to FIG. 1, when transferring chemicals from the source 3 to the destination 5, the order in which equipment is started and/or stopped must sometimes be controlled. As an example, when transferring liquids from the source 3 to the destination using a centrifugal pump, it is important that the valves on the suction and discharge side of the pump are opened before the pump is started to avoid running the pump dry and thus damaging the pump.

Figure 3:
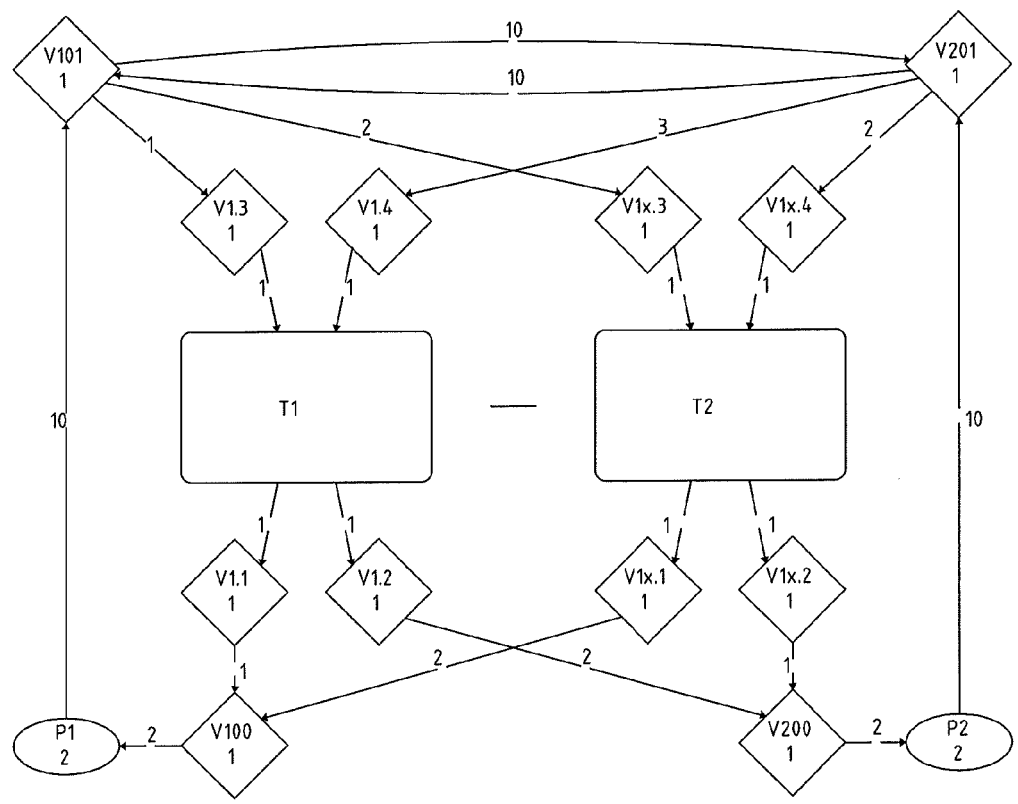
FIG. 3 shows a graph model representation of a simple plant for the transfer of drilling fluids.

FIG. 3 shows a simplified example of a directional graph model representation of chemical plant. The graph model shows two tanks, T1 and T2, representing a source 3 and a destination 5, respectively. Below the first tank T1 are located two discharge valves v1.1 and v1.2 and below the second tank T2 are also located two discharge valve v1x.1 and v1x.2. On top of the first tank T1 are located two filling valves v1.3 and v1.4 while two more filling valves v1x.3 and v1x.4 are located above the second tank T2. The graph model further includes valves V101, V201, V100 and V200 and pumps P1 and P2. The lines between the equipment, i.e. between the valves and pumps, indicate pipes that connect the equipment. The arrows indicate the direction of flow while the number on each line indicates the cost of the connection. The higher the number, the higher the cost associated with a specific flow. The number on each piece of equipment, below the equipment identification, denotes the sequence number, here 1 or 2, indicating that the valves need to be opened before running the pumps.

Transferring a chemical from the first tank T1 to the second tank T2 may be done by engaging different sets of valves and pumps and thus directing the flow of chemicals along different paths. Possible paths are:

P1: T1→V1.1→V100→P1→V101→V1x.3→T2 Total cost: 1+1+2+10+2+1=17; and

P2: T1→V1.2→V200→P2→V201→V1x.4→T2 Total cost: 1+2+2+10+2+1=18

Under a normal operation, if a "shortest path mode of operation" is invoked, the routing control unit 2 will choose the P1 in the example above since it is the shortest path, i.e. it has the lowest cost associated with it.

However, there may be many different and freely configurable "modes of operation" which produce an optimum path, exhibiting one or more of the following properties: Solution to shortest path and widest path problems, maximization of resource (equipment, pipes, etc.) utilization, maximum lifespan of equipment, pipe, etc. i.e.to keep a low maintenance cycle.

Figure 4:
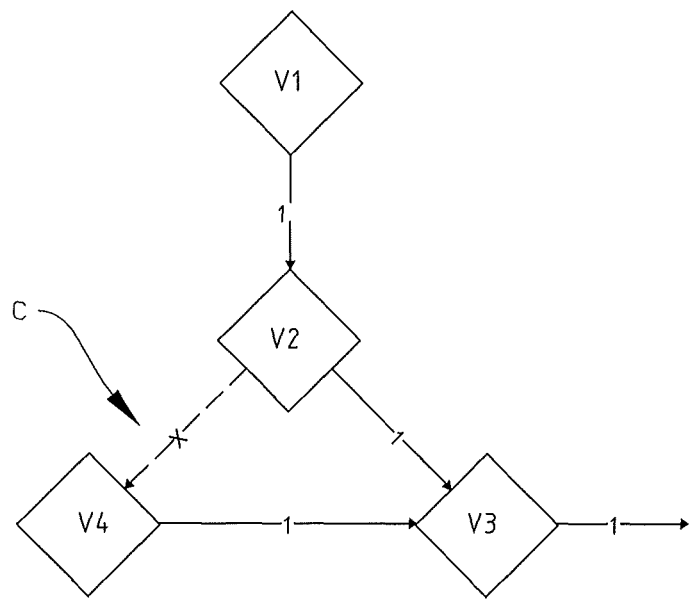
FIG. 4 shows an example of how a restriction may be incorporated into a graph model.

Through the process control unit 4, the routing control unit 2, by means of the routing module 21, controls the applicable equipment. This may be by done controlling all the equipment individually and/or in combination with composite object handling, implying that the process control unit 4 may for example have logics for control of a set of equipment e.g. a machine, a pump with applicable valves etc. It also ensures that any equipment on or adjacent to the chosen path/route is flagged as "occupied". This is to ensure that there is no interference with any other ongoing flow of chemicals. As an example, when the discharge valve V1.1 on the first tank T1 is opened, the other discharge valve V1.2 is closed and both are flagged as "occupied". It is only when the routing module 21 is disengaged, that the "occupied" flag is removed and the valves V1.1 and V1.2 again become available The possible use of constraints is exemplified with reference to FIG. 4. Constraints are a set of rules which extend business logic module 23. These rules restrict the formation of a routing-path by inhibiting the relation between nodes, i.e. equipment, in a specific order. In the example directional graph model, a valve V1 is connected to a valve V2. V2 is further connected to both a valve V3 and a valve V4 via different routes, while V4 is connected to V3. The connection line between V2 and V4 is dashed, implying that this is a constraint C. A valid path is V1→V2→V3 as there are no constraints C along this path. Paths V1→V2→V4 and V1→V2→V3→V4 are not valid as the constraint C is restricting any path going to V4 after it has "passed by" V2, i.e. formation of a path is not allowed if V2 appears before V4 in the path.

An example where using constraints is helpful is to avoid any routing that causes excessive abrasion, such as when chemicals are transferred over high-angular bends.

It should be noted that the above-mentioned exemplary embodiments illustrate rather than limit the invention, and that those of ordinary skill in the art will be able to design many alternative embodiments without departing from the scope of the appended claims. In the claims, any reference signs placed between parentheses shall not be construed as limiting the claim. Use of the verb "comprise" and its conjugations is open ended and does not exclude the presence of elements or steps other than those stated in a claim. The articles "a" or "an" preceding an element does not exclude the presence of a plurality of such elements.

The above description is directed to exemplary embodiments of a system for conveying drilling fluids. One of ordinary skill in the art will understand that the description has broad application, and that the discussion is meant only to be exemplary of the described embodiments, and not intended to suggest that the scope of the disclosure, including the claims, is limited only to those embodiments. The embodiments disclosed should not be interpreted, or otherwise used, as limiting the scope of the disclosure, including the claims. For example, in the exemplary embodiments described above, the system conveys drilling fluid(s) in a drilling context. One of ordinary skill in the art will readily appreciate that the disclosed system and associated methodology may be used to convey fluids other than drilling fluids and for applications outside of a drilling context, or for that matter the oil and gas industry.

The invention claimed is:

1. A drilling fluid plant for automatic routing of chemicals, the drilling fluid plant comprising:
a plurality of equipment pieces comprising sources and destinations;
paths comprising pipes that connect the sources and the destinations;
a process control unit configured to communicate with the equipment pieces; and
a routing control unit configured to:
communicate with the process control unit,
obtain a graph model depicting the equipment pieces as nodes and the paths as edges, and
obtain control algorithms for finding an optimum path from among the paths based on feedback from the process control unit and based on costs,
wherein each of the edges has a cost associated with it, and
wherein the cost is based on at least one of pipe length, pipe diameter, pipe inclination, or pipe bend.

2. The drilling fluid plant according to claim 1, wherein the routing control unit comprises a routing module, a business logic module, and a user interface module.

3. The drilling fluid plant according to claim 2, wherein the drilling fluid plant further comprises a communication layer through which the routing control unit may communicate with the process control unit.

4. The drilling fluid plant according to claim 2, wherein one or more constraints are built into the routing control unit and inhibit use of one or more possible paths or parts of possible paths.

5. A method for automatic routing of chemicals by means of a drilling fluid plant according to claim 1, the method comprising:
finding the optimum path based on feedback from the process control unit; and
transferring the chemicals from one of the sources to one of the destinations along the optimum path by regulating one or more of the equipment pieces.

6. The method according to claim 5, wherein finding the optimum path includes depicting the equipment pieces and the paths in the graph model in the routing control unit.

7. The method according to claim 6, wherein finding the optimum path includes implementing a graph search algorithm in the routing control unit.

8. The method according to claim 7, wherein implementing the graph search algorithm includes using a shortest path algorithm.

9. The method according to claim 8, wherein implementing the graph search algorithm further includes using a resource-constrained shortest path algorithm.

10. The method according to claim 8, further comprising simultaneously transferring chemicals along multiple paths between multiple sources and multiple destinations.

11. The method according to claim 7, wherein implementing the graph search algorithm includes implementing a path search algorithm minimizing interferences (PSAMI) using a Ford-Fulkerson algorithm.

12. The method according to claim 7, wherein finding the optimum path further includes manually supplying information to the routing control unit.

13. The method according to claim 7, wherein transferring the chemicals includes operating equipment along the optimum path in a pre-determined order.

14. The method according to claim 7, further comprising adapting an ongoing transfer of chemicals between the source and the destination by means of the routing control unit, based on feedback from the process control unit.

15. The method according to claim 7, further comprising storing data related to completed transfers of chemicals.

16. The method according to claim 7, further comprising sending commands to the routing control unit from the process control unit.

17. The method according to claim 7, further comprising letting the routing control unit take over an already ongoing transfer process.

18. The drilling fluid plant according to claim 1, wherein each of the edges has a higher cost when its pipes have longer pipe lengths or have smaller pipe diameters.

19. The drilling fluid plant according to claim 1, wherein each of the edges has a lower cost when its pipes have shorter pipe lengths or have larger pipe diameters.

20. A non-transitory computer-readable medium or media storing computer-executable instructions for causing a processor to perform a method for automatic routing of chemicals in a plant by a drilling fluid plant, the drilling fluid plant comprising:
a plurality of equipment pieces comprising sources and destinations;
paths comprising pipes that connect the sources and the destinations;
a process control unit configured to communicate with the equipment pieces; and
a routing control unit configured to:
communicate with the process control unit,
obtain a graph model depicting the equipment pieces as nodes and the paths as edges, and
obtain control algorithms for finding an optimum path from among the paths based on feedback from said process control unit,
wherein the method comprises the steps of:
finding the optimum path further based on the feedback from the process control unit and based on costs, wherein each of the edges has a cost associated with it, and wherein the cost is based on at least one of pipe length, pipe diameter, pipe inclination, or pipe bend, and
transferring the chemicals from one of the sources to one of the destinations along the optimum path by regulating one or more of the equipment pieces.

21. The non-transitory computer-readable medium or media according to claim 20, wherein finding the optimum path includes depicting the equipment pieces and the paths in the graph model in the routing control unit.

22. The non-transitory computer-readable medium or media according to claim 21, wherein finding the optimum path further includes implementing a graph search algorithm in the routing control unit.

23. The non-transitory computer-readable medium or media according to claim 22, wherein implementing the graph search algorithm includes using a shortest path algorithm.

24. The non-transitory computer-readable medium or media according to claim 22, wherein implementing the graph search algorithm includes implementing a path search algorithm minimizing interferences (PSAMI) using a Ford-Fulkerson algorithm.

25. The non-transitory computer-readable medium or media according to claim 20, wherein each of the edges has a higher cost when its pipes have longer pipe lengths or have smaller pipe diameters.

26. The non-transitory computer-readable medium or media according to claim 20, wherein each of the edges has a lower cost when its pipes have shorter pipe lengths or have larger pipe diameters.

* * * * *